United States Patent
Ikeda et al.

(10) Patent No.: US 10,165,571 B2
(45) Date of Patent: Dec. 25, 2018

(54) APPLICATION STATE CHANGE NOTIFICATION PROGRAM AND METHOD THEREFOR

(71) Applicant: FREEBIT CO., LTD., Tokyo (JP)

(72) Inventors: Hiroki Ikeda, Tokyo (JP); Atsuki Ishida, Tokyo (JP); Hiroshi Oizumi, Tokyo (JP); Noriaki Misawa, Tokyo (JP)

(73) Assignee: Freebit Co., Ltd., Tokyo (JP)

( * ) Notice: Subject to any disclaimer, the term of this patent is extended or adjusted under 35 U.S.C. 154(b) by 326 days.

(21) Appl. No.: 15/021,151

(22) PCT Filed: Sep. 11, 2014

(86) PCT No.: PCT/JP2014/074148
§ 371 (c)(1),
(2) Date: Jun. 16, 2016

(87) PCT Pub. No.: WO2015/037684
PCT Pub. Date: Mar. 19, 2015

(65) Prior Publication Data
US 2016/0286544 A1    Sep. 29, 2016

(30) Foreign Application Priority Data
Sep. 11, 2013   (JP) .................................. 2013-188738

(51) Int. Cl.
*H04W 72/04*    (2009.01)
*H04W 76/10*    (2018.01)
(Continued)

(52) U.S. Cl.
CPC ......... *H04W 72/048* (2013.01); *H04W 28/02* (2013.01); *H04W 28/18* (2013.01); *H04W 8/26* (2013.01); *H04W 76/22* (2018.02)

(58) Field of Classification Search
CPC ... H04W 72/048; H04W 76/10; H04W 28/20; H04W 8/26; H04W 72/10; H04L 12/859
See application file for complete search history.

(56) References Cited

U.S. PATENT DOCUMENTS 9,635,486 B2 * 4/2017 Ford ..................... H04W 4/001
9,832,795 B2 * 11/2017 Perez Martinez ...... H04L 67/02
(Continued)

FOREIGN PATENT DOCUMENTS

| CN | 102932173 A | 2/2013 |
| JP | 2004-153778 A | 5/2004 |

(Continued)

OTHER PUBLICATIONS

International Search Report PCT/JP2014/074148.
International Preliminary Report on Patentability PCT/JP2014/074148.

*Primary Examiner* — Maharishi V Khirodhar
*Assistant Examiner* — Kenneth P Hunt
(74) *Attorney, Agent, or Firm* — Haynes and Boone, LLP

(57) ABSTRACT

There is provided an app management software 16 for cooperating with a bandwidth control system 2 for dynamically changing a communication bandwidth of the mobile information terminal 3 for each type of application 3a which is installed on the mobile information terminal. This software comprises: a module 22 for causing the mobile information terminal 3 to detect a type of application 3a which communicates from the mobile information terminal 3; a module 24 for causing the mobile information terminal 3 to obtain mobile information terminal identification information for uniquely identifying the mobile information terminal on a communication network; a module 26 for causing the mobile information terminal 3 to send the type of application as well as information for identifying the mobile information terminal to the bandwidth control system; and a (Continued)

display section 28 for causing the mobile information terminal 3 to receive a communication status for each application from the bandwidth control system and displaying the communication status on a display of the mobile information terminal.

38 Claims, 12 Drawing Sheets

(51) Int. Cl.
*H04W 28/02* (2009.01)
*H04W 28/18* (2009.01)
*H04W 8/26* (2009.01)
*H04W 76/22* (2018.01)

(56) References Cited

U.S. PATENT DOCUMENTS

| | | | |
|---|---|---|---|
| 2007/0105549 A1* | 5/2007 | Suda | H04W 28/16 |
| | | | 455/426.2 |
| 2007/0283014 A1 | 12/2007 | Shinomiya et al. | |
| 2008/0013545 A1* | 1/2008 | Ono | H04L 12/66 |
| | | | 370/395.21 |
| 2009/0067419 A1* | 3/2009 | Araki | H04L 12/5691 |
| | | | 370/389 |
| 2011/0286344 A1* | 11/2011 | Hanaoka | H04W 36/26 |
| | | | 370/252 |
| 2012/0163232 A1 | 6/2012 | Yoo | |
| 2012/0254442 A1 | 10/2012 | Uemura et al. | |
| 2012/0260179 A1 | 10/2012 | Reshadi | |
| 2013/0100955 A1 | 4/2013 | Dunlap et al. | |
| 2013/0165181 A1 | 6/2013 | Hasegawa | |
| 2014/0204756 A1 | 7/2014 | Higashino et al. | |
| 2018/0013695 A1* | 1/2018 | Kakadia | H04L 47/824 |

FOREIGN PATENT DOCUMENTS

| | | |
|---|---|---|
| JP | 2005-086323 A | 3/2005 |
| JP | 2005-204309 A | 7/2005 |
| JP | 2011-155600 A | 8/2011 |
| JP | 2012-138904 A | 7/2012 |
| JP | 2012-215943 A | 11/2012 |
| JP | 2012-244492 A | 12/2012 |
| JP | 2013-58994 A | 3/2013 |
| JP | 2013-131940 A | 7/2013 |
| JP | 2013-207504 A | 10/2013 |
| JP | 2014-146950 A | 8/2014 |
| WO | 2006/095438 A1 | 9/2006 |

\* cited by examiner

| User ID | App | Remaining Download Amount |
|---|---|---|
| User A | all | Unlimited |
| | WEB | 100MB |
| | Youtube | |
| | Gmail | |
| | Twitter | |
| | Yahoo | |
| | Facebook | Unlimited |
| | 050 | Unlimited |

FIG. 8

| User ID | App | Line Speed | Com-pression | Remaining Amount | Available Time Frames | Available Locations | Monthly Usage |
|---|---|---|---|---|---|---|---|
| User A | all | 100k | Medium | 100 MB | -- | - | 100M |
| | WEB | 200k | High | 20MB | -- | - | 500M |
| | Youtube | 75M | - | 50MB | Off-Peak | - | 1G |
| | Gmail | 200k | - | 20MB | -- | - | 20M |
| | Twitter | 1M | High | 20MB | | A Location | -- |
| | Yahoo | 75M | - | 20MB | Off-Peak | B Location | -- |
| | Facebook | WiFi | - | - | -- | C Location | -- |
| | 050 | - | - | - | -- | - | -- |

FIG. 9

| User ID | App | Parameter | Line Speed |
|---|---|---|---|
| User A | all | | 100k |
| | WEB | www.google.com | 75Mbps |
| | WEB | www.facebook.com | 115Mbps |
| | WEB | www.freebit.net | 50Mbps |
| | WEB | www.yahoo.co.jp | 100k |
| | WEB | -- | -- |

FIG. 10

| App | Speed | Congestion Level |
|---|---|---|
| all | 100k | Normal |
| WEB | 200k | High |
| Youtube | 75M | Low |
| Gmail | 200k | High |
| Facebook | 75M | Normal |

FIG. 12

APPLICATION STATE CHANGE NOTIFICATION PROGRAM AND METHOD THEREFOR

CROSS-REFERENCE TO RELATED APPLICATION

This application is a United States national phase application of co-pending International Patent Application No. PCT/JP2014/074148 filed Sep. 11, 2014, which claims priority to and the benefit of Japanese Patent Application No. 2013-188738 filed Sep. 11, 2013, the disclosures of which are incorporated herein by reference.

FIELD OF THE INVENTION

The present invention relates to a network connection system used in a mobile network, and particularly relates to an application status change notification program and a method thereof for specifically performing a preferential control/bandwidth control of a connection communication bandwidth of a specific application installed on a terminal device on a mobile network.

BACKGROUND OF THE INVENTION

In recent years, due to the improved performance of mobile information terminals, so-called smartphones, their users have been able to freely choose and install necessary application software. Here, in many cases, the application software is configured to connect with a specific service server on the Internet, and receive various information from this service server to thereby present information required by the user on the smartphone.

Here, in a typical network connection configuration, IP packets from the application software are transferred on a best-effort basis, and it is impossible to preferentially control the IP packets by application. Therefore, it is impossible to, for example, preferentially control communication of audio-information-handling application software, such as one for IP phones, over communication of other application software, causing dissatisfaction among smartphone users.

While it is possible to preset an IP address of a specific smartphone at a router to preferentially control connections from the smartphone, in that case, connections of not only an IP phone, but also all other applications of that smartphone will be preferentially controlled. Also, while it is possible to preferentially control connections only to a specific service server, recent IP phone services are provided through a plurality of collaborating servers, and therefore, it is difficult to identify all IP addresses of these plurality of servers and preset them at the router.

In other words, in the network connection system of conventional mobile carriers, it has been difficult to address needs for providing users with high-quality phone services by, for example, performing a preferential control/bandwidth control on the IP packets of IP phone applications only.

Considering the above situation, the purpose of the present invention is to provide an application status change notification program and a method thereof capable of providing a high-quality service with a very simple configuration even when a plurality of different applications are executed on a mobile information terminal.

SUMMARY OF THE INVENTION

In order to achieve the above object, according to a principal aspect of the present invention, there is provided an application status change notification program stored in a storage medium for causing a mobile information communication terminal to perform the following processing, wherein this application status change notification program cooperates with a band control system for dynamically changing a communication band of the mobile information communication terminal for each type of an application which is installed on the mobile information communication terminal, said program comprising: (1) a section for causing the mobile information terminal to detect a type of application which communicates from the mobile information terminal; (2) a section for causing the mobile information terminal to obtain mobile information terminal identification information for uniquely identifying the mobile information terminal on a communication network; (3) a section for causing the mobile information terminal to send the type of application as well as information for identifying the mobile information terminal to the band control system; and (4) a section for causing the mobile information terminal to receive a communication status for each application from the band control system and displaying the communication status on a display of the mobile information terminal.

According to one embodiment of the present invention, the section (1) further comprises a section for causing the mobile information terminal to detect a type of application which is displayed as active on the mobile information terminal.

According to another embodiment, this program further comprises a section for causing the mobile information terminal to detect a geographical location of the mobile information terminal; and a section for causing the mobile information terminal to send the geographical location of the mobile information terminal as well as the information for identifying the mobile information terminal to the bandwidth control system.

According to another embodiment, the section (1) comprises a section for causing the mobile information terminal to detect a process ID of an application which is activated on the mobile information terminal; the section (3) comprises a section for causing the mobile information terminal to include in a packet to be sent from the application, the process ID or a specific tag different for each process, and send the packet as well as the information for identifying the mobile information terminal to the bandwidth control system.

According to another embodiment, the program further comprises a section for causing the mobile information terminal to detect an IP address and/or a port number of an application which is activated on the mobile information terminal, wherein the section (4) causes the mobile information terminal to include in a packet to be sent from the application, the IP address and/or the port number, and send the packet as well as the information for identifying the mobile information terminal to the bandwidth control system.

According to yet another embodiment, this program further comprises a section for causing the mobile information terminal to detect a geographical location of the mobile information terminal; and a section for causing the mobile information terminal to send the geographical location of the mobile information terminal as well as the information for identifying the mobile information terminal to the bandwidth control system.

According to one embodiment, the bandwidth control system comprises an application connection environment management server provided on the Internet, wherein the application connection environment management server detects a type of application which is active on a specific mobile information terminal, and sends a connection policy according to the type of application as well as the information for identifying the mobile information terminal to a bandwidth control router, wherein the bandwidth control router transfers the packet from the identified mobile information terminal either with a preferential control or a predetermined preferred communication bandwidth according to the connection policy received from the application connection environment management server.

In this case, the application connection environment management server may look up a table, which table storing therein types of applications requiring a preferential connection and a bandwidth control, and the applications' respective connection policies, retrieve a connection policy according to a type of application software from the table, and send the connection policy to the bandwidth control router. Also, the connection policy preferably includes a different communication priority or communication bandwidth setting per specific application. Further, the application status change notification program preferably comprises a data communication amount recording section for monitoring a data communication amount by the bandwidth control router for each mobile information terminal and recording a downloaded data communication amount for each application according to the type of application which is active on the mobile information terminal.

According to a second principal aspect of the present invention, there is provided an application status change notification method stored in a storage medium for causing a mobile information communication terminal to perform the following processing, wherein an application status change notification program cooperates with a bandwidth control system for dynamically changing a communication bandwidth of the mobile information communication terminal for each type of an application which is installed on the mobile information communication terminal, the method comprising the steps of:
(1) causing the mobile information terminal to detect a type of application which communicates from the mobile information terminal;
(2) causing the mobile information terminal to obtain mobile information terminal identification information for uniquely identifying the mobile information terminal on a communication network;
(3) causing the mobile information terminal to send the type of application and information for identifying the mobile information terminal to the bandwidth control system; and
(4) causing the mobile information terminal to receive a communication status for each application from the bandwidth control system and displaying the communication status on a display of the mobile information terminal.

Characteristics of the present invention other than the claimed characteristics will be disclosed in the following description of the preferred embodiments and the accompanying drawings.

BRIEF DESCRIPTION OF THE DRAWINGS

FIG. 8 is a conceptual diagram describing a bandwidth control and connection policy according to the one embodiment of the present invention;

FIG. 9 is a conceptual diagram describing a bandwidth control and connection policy according to the one embodiment of the present invention;

FIG. 10 is a conceptual diagram describing a bandwidth control and connection policy according to the one embodiment of the present invention;

FIG. 12 is a diagram showing an example display screen of a mobile information terminal according to the one embodiment of the present invention;

DETAILED DESCRIPTION OF THE INVENTION

In this embodiment, an example is described wherein a program of the present invention is provided by a Mobile Virtual Network Operator (MVNO operator).

An MVNO operator refers to an operator which does not own a physical mobile network, but rents it from a Mobile Network Operator (MNO operator), which actually owns the mobile network, to thereby provide a communication service as said operator's own house brand.

Before describing a characteristic configuration of the present invention, for purposes of understanding the present invention, an example of data communication environment via a mobile network will be first described with reference to FIG. 1.

(Data Communication Environment as a Prerequisite of the Present Invention)

Figure 1:
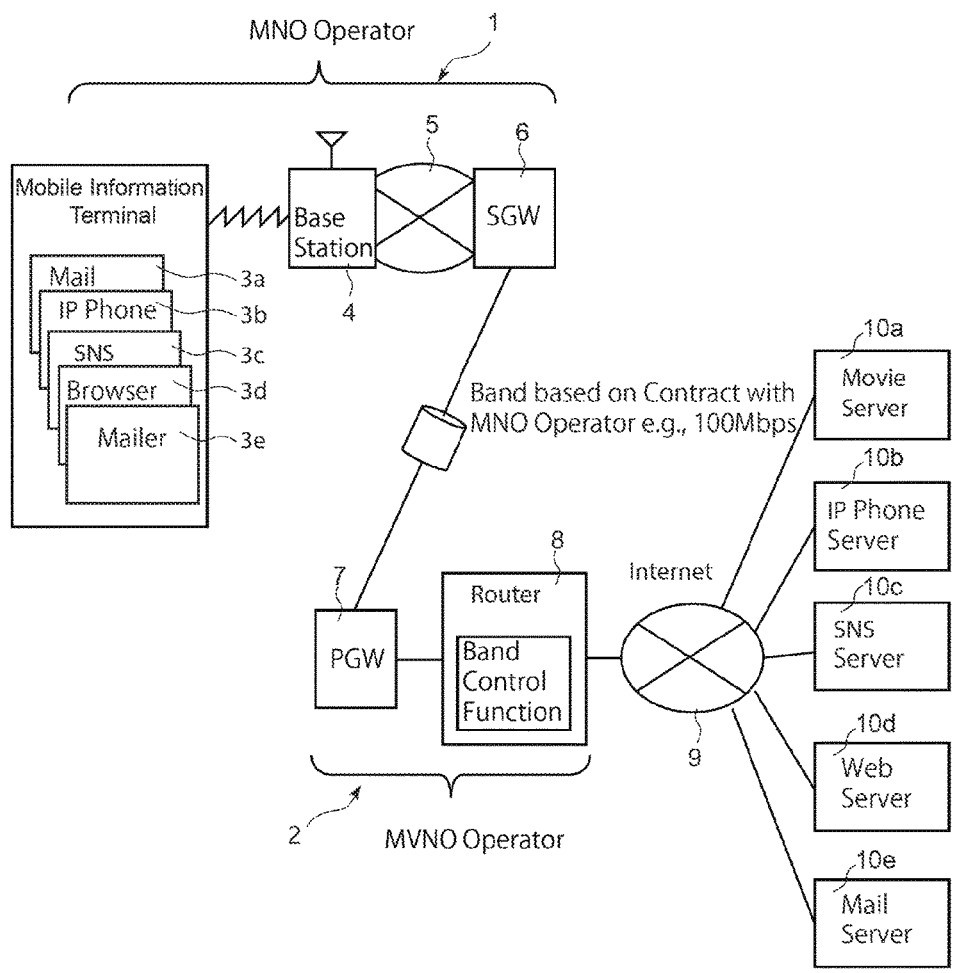
FIG. 1 is an overall schematic structural view showing a data communication environment through a mobile network.

Indicated as 1 in FIG. 1 is a mobile network of an MNO operator, and indicated as 2 is a network connection system of an MVNO operator.

A mobile information terminal 3 of a user, who subscribes a service of the MVNO operator, is connected to a mobile network 5 of the MNO operator through a base station 4; routed from a service gateway (SGW) 6 of the MNO operator via a packet data network gateway (PGW) 7 of the MVNO operator to a network connection system 2 of the MVNO operator; and then, connected to various servers 10a-10e on the Internet by a router 8 provided in this network connection system 2. Between the service gateway 6 on the MVO operator side and the packet data network gateway 7 on the MVNO operator side, a communication bandwidth of, for example, 100 Mbps is reserved and configured according to a contract between these MVO and MVNO operators.

The user's mobile information terminal 3 is a so-called smartphone, and has a CPU, a RAM and a ROM (not shown). In the ROM, operating system software program (hereinafter referred to as "OS") such as iOS (product name) or Android (product name) and various application software programs (hereinafter referred to as "applications") 3a-3e are installed, and data used by the OS and the applications 3a-3e is stored.

These applications 3a-3e installed in the user's mobile information terminal 3 include movie software 3a, an IP phone 3b, an SNS 3c, a browser 3d and a mailer 3e, and the user may additionally and freely install any application based on the user's preferences. These applications 3a-3e on the mobile information terminal 3 are called, deployed and executed on the RAM by the CPU as needed, allowing connections with various servers 10a-10e on the Internet 9, via the MNO operator's mobile network 5 and the MVNO operator's network connection system 2, in order to communicate required data with the servers 10a-10e and perform various processes.

As shown in this figure, when executed, the applications 3a-3e of the mobile information terminal are connected with a plurality of servers 10a-10e each having a different IP address. In this case, the router 8 provided in the network connection system 2 is adapted to transfer packets 3a-3e from the mobile information terminal 3 to their destination servers 10a-10e based on an IP address included in header information of the packets.

This router 8 is provided with a bandwidth control function 12 for controlling a transfer order, a transfer speed and the like of passing packets based on an IP address of the mobile information terminal 3. This bandwidth control function is also called a QoS function, and is roughly categorized into "preferential control" and "bandwidth control." When applied to the present invention, the preferential control scheme differentiate application types for packets flowing on networks based on a source IP address, and assign an absolute priority to each application; whereas the bandwidth control function assigns an upper limit of a communication bandwidth usable for each application.

According to this bandwidth control, packets of higher-priority applications are always preferentially output or allowed to use lager communication bandwidths to thereby enable stable packet transfer for higher-priority services.

In these QoS controls, it is important to accurately identify a type of application from received IP packets. In general, movie or audio packets from movie software, IP phone software or the like need to be either transferred preferentially or transferred in a broad communication bandwidth in order to maintain their quality. In this case, the router 8 needs to identify, from numerous IP packets received, only the ones from movie software, IP phone software or the like. This IP packet identification is performed generally based on an IP address of a source or a destination, or a transfer port number.

For example, if a specific terminal device such as a dedicated IP phone device or a VoIP gateway is used with a fixed IP address, the IP address of the source terminal device may be specified to thereby ensure identification of packets from that source.

However, this method may not be utilized in the case of the afore-mentioned mobile information terminal 3, which may run a plurality of apps with different priorities on the same terminal. That is, when attempting to identify packets solely based on an IP address, communication via the same IP address with low priorities will be also preferentially controlled or bandwidth-controlled. Also, in an environment where an IP address is automatically allocated to a mobile information terminal with the DHCP, terminals cannot be identified based on their IP addresses.

On the other hand, it may be contemplated to identify application types based on IP addresses of the destination servers 10a-10e. For example, if packets from the mobile information terminal 3 are always connected to a specific IP phone server 10b, service types for those packets may be identified with certainty by specifying an IP address of the IP phone server 10b. However, in the case of some recent applications, connections are made to many different servers from single application, therefore, making it difficult or practically impossible to specify all the connected servers.

As previously discussed, the present invention is provided considering the above situation.

(Characteristic Structure of the Present Invention)

A characteristic structure of the present invention will be described below with reference to FIGS. 2-14, using an example applied to the mobile communication environment of FIG. 1 discussed above. Note that the same reference alphanumerals are used for elements similar to ones in FIG. 1, and descriptions for those like elements will be omitted.

Figure 2:
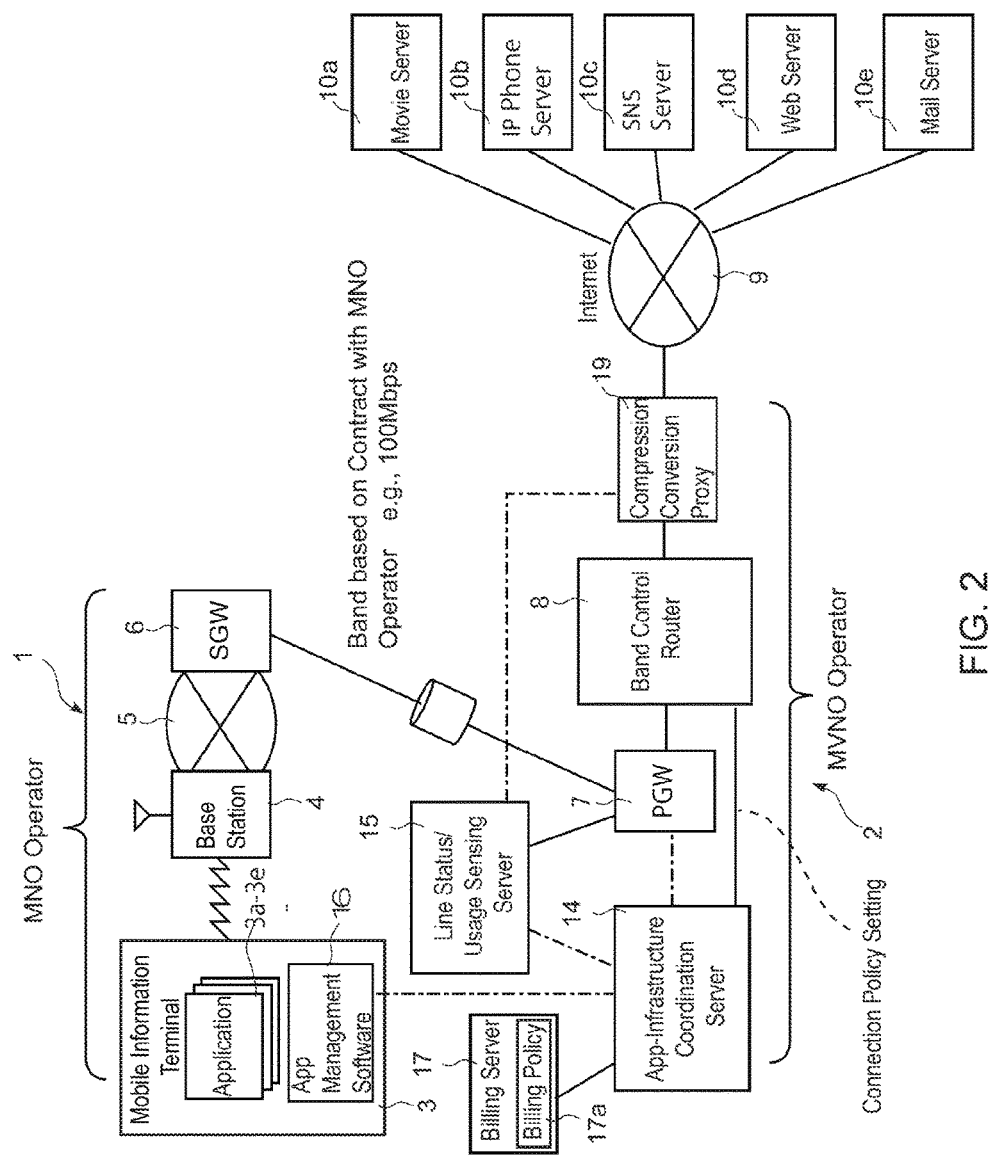
FIG. 2 is an overall schematic structural view showing a data communication environment according to one embodiment of the present invention.

As shown in FIG. 2, the present embodiment is characterized in that the MVNO operator's system 2 comprises a bandwidth control router 8, which basically has similar structure and functions to ones of the router 8 of FIG. 1, as well as an app-infrastructure coordination server 14 compatible with functions of the present invention ("application connection environment management server" of the present invention); a line status/usage sensing server 15 for monitoring line market status; a billing server 17 for managing billing according to a usage bandwidth; a compression conversion proxy server 19; and an app management software 16 installed on the mobile information terminal 3. Note that, in the present invention, the system 2 on the MVNO operator side, including the above bandwidth control router 8, is referred to as a "bandwidth control system."

First, the app management software 16 is installed on the mobile information terminal 3. This application management software 16 sends information about types of applications 3a-3e which are activated on the mobile information terminal 3 as well as an IP address and a port number for identifying the mobile information terminal 3 to the app-infrastructure coordination server 14.

The app-infrastructure coordination server 14, which is provided in the MVNO operator's system 2 and designed to cooperate with the app management software 16 installed on the mobile information terminal 3, comprises functions to detect types of applications 3a-3e active on the mobile information terminal 3, and set a connection policy according to the types of applications 3a-3e as well as the IP address and the port number for identifying the mobile information terminal 3 onto the bandwidth control router 8.

The bandwidth control router 8 transfers packets from the identified mobile information terminal 3 either with a preferential control or a predetermined preferred communication bandwidth according to the connection policy received from the app-infrastructure coordination server 14. As a result, communication will be performed with the preferential control or in the preferred communication bandwidth according to the types of applications 3*a*-3*e*.

The line status/usage monitoring server 15 monitors packets passing the packet gateway 7 (PGW) provided in the system 2 on the MVNO operator side, outputs a data communication amount in association with the IP address and the port number of the mobile information terminal 3, and notifies app-infrastructure coordination server 14.

A structure of the app-infrastructure coordination server 14 and the app management software 16 of the present invention will be described in detail below.

(App Management Software)

Figure 3:
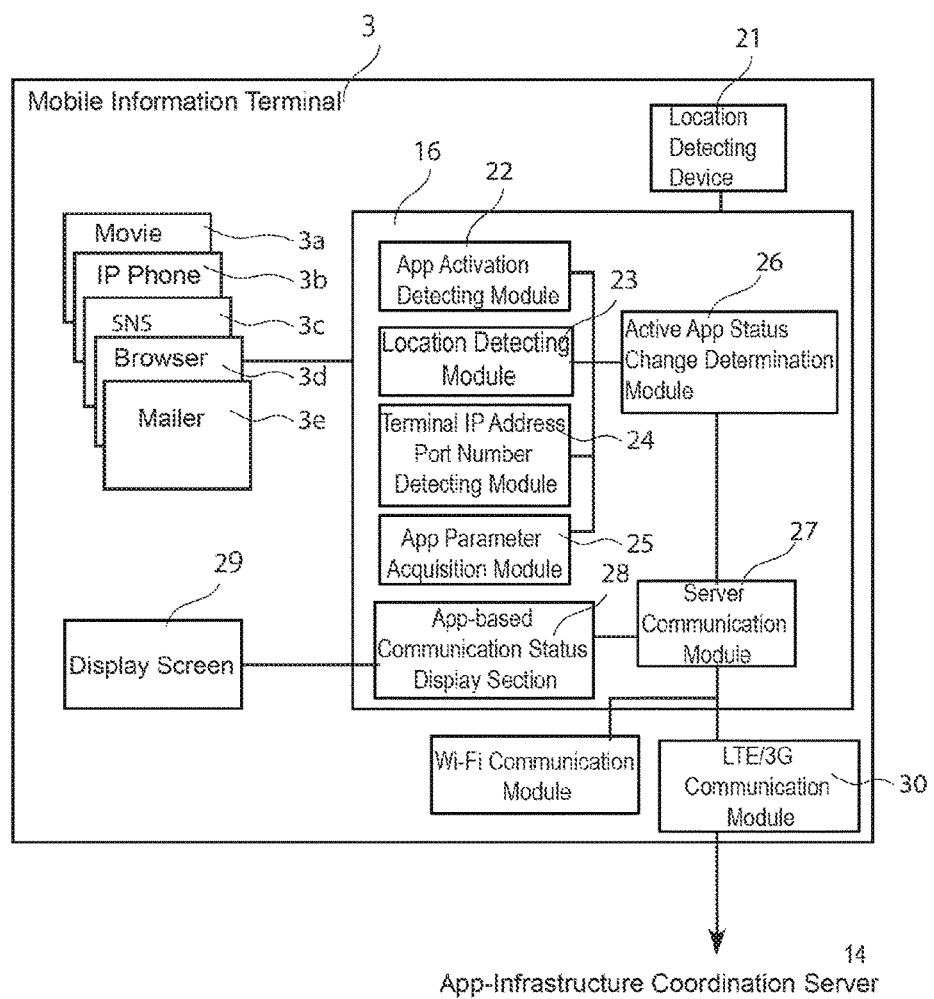
FIG. 3 is a schematic structural view showing app management software according to the one embodiment of the present invention.

FIG. 3 is a schematic diagram of a user's mobile information terminal 3.

Installed in this mobile information terminal 3 are an OS (not shown), a plurality of different applications 3*a*-3*e* and an app management software 16 of the present invention.

This app management software 16 comprises an app detecting module 22 for cooperating with the OS (not shown) of the mobile information terminal 3 and detecting that a specific application is launched and becomes active; a location detecting module 23 for cooperating with a location detecting device 21 such as a GPS provided in this mobile information terminal 3, and detecting a geographical location of this mobile information terminal 3; a terminal IP address and port number detecting module 24 for cooperating the OS and detecting an IP address and a port number of this mobile information terminal 3; an app parameter detecting section 25 for detecting parameters of applications 3*a*-3*e*; an active app status change determination module 26 for determining any status change of active apps based on the detection results of the detecting modules 22-25; a server communication module 27 for sending the status change determined by the active app status change determination module 26 to the app-infrastructure coordination server 14; and an app communication status display section 28 for displaying on a display screen 29 of this mobile information terminal 3, a communication status of each active application of this mobile information terminal 3, and a communication status and a line congestion status for each app received from the server 14. In this embodiment, this app management software 16 is implemented in the form of API for the OS.

Basic operation of the app management software 16 will be discussed below with reference to FIG. 4. Note that reference alphanumerals S1-S6 in the figure are for referencing processes and correspond with Steps S1-S6 in the following discussion, respectively.

First, upon activation of this management software 16, the app activation detecting module 22 launches and monitors activation of any of the applications 3*a*-3*e* installed on the mobile information terminal 3 on the display screen 29 of this mobile information terminal 3 (as shown as Step S1 in the figure). As used in this embodiment, the term "active" means that an activated application is displayed in foreground on the display screen 29 of the mobile information terminal 3 and it gained the user's attention. Once an application is activated, this app activation detecting module 22 monitors this application at a certain time interval to determine if the application is active, and if another application launched and became active. If a particular application is active, this app activation detecting module 22 outputs an application name (a unique name of the application output by the OS) and sends it to the active app status change determination module 26.

This active app status change determination module 26 determines that an "active app status change" occurred (Step S2) when any application name received from the app activation detecting module 22 changes, that is, when any active application changes.

On the other hand, the location detecting module 23 monitors signals from the location detecting device 21 (Step S3) and sends a current location coordinate of the mobile information terminal 3 to the active app status change determination module 26. This active app status change determination module 26 determines that an "active app status change" occurred (Step S2) when the location coordinate information received from the location detecting module changes by a certain value or more, or matches a certain condition.

In addition, the terminal IP address and port number detecting module 24 coordinates with a communication module 30 of the mobile information terminal 3 to monitor a current IP address and a currently-used communication port number of this mobile information terminal 3 (Step S4), and sends the obtained information to the active app status change determination module 26. This active app status change determination module 26 determines that an "active app status change" occurred (Step S2) when the IP address or the port name received from the terminal IP address and port number detecting module changes.

Further, the app parameter acquisition module 25 coordinates with a particular application to obtain parameters associated with that application (Step S5), and sends the parameters to the active app status change determination module 26. Example parameters include a connection destination URL for a browser, or a connection destination phone number for an IP phone, for example. The active app status change determination module 26 determines that an "active app status change" occurred (Step S2) when the parameters change.

As discussed above, the active app status change determination module 26 determines whether any "active app status change" occurs based on the information received from the respective modules 22-25, and if it determines that the status change occurred, it sends the determination result to the app-infrastructure coordination server 14 (Step S6).

At this time, the information sent to the app-infrastructure coordination server 14 includes, for example, an app name, a domain name base, a coordinate location, app parameters, an IP address and a port number in use for the mobile information terminal, etc. This information is sent out only when the status change occurrence is determined in order to reserve a line usage bandwidth.

(App-Infrastructure Coordination Server)

Figure 5:
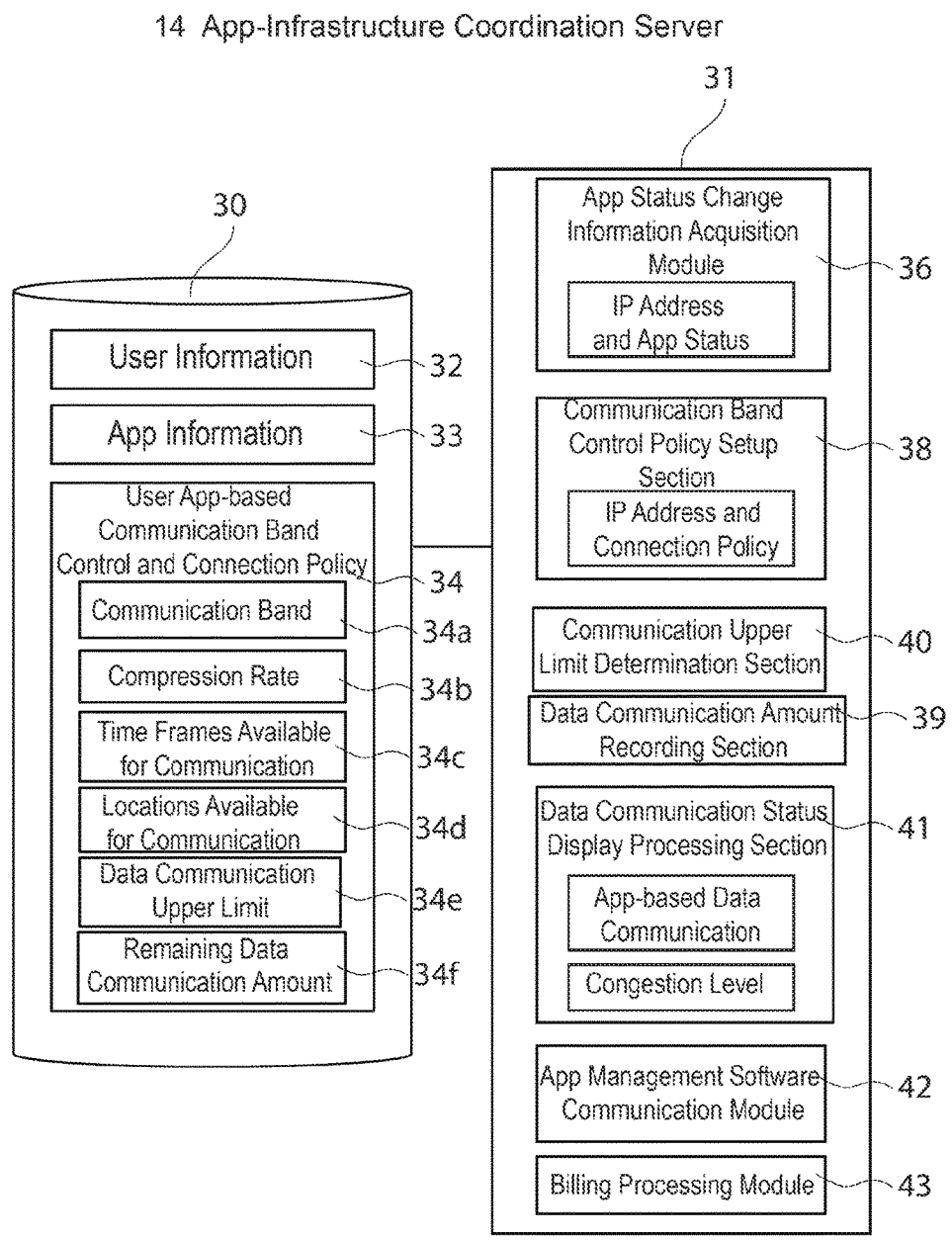
FIG. 5 is a schematic structural view showing an app-infrastructure coordination server according to the one embodiment of the present invention.

FIG. 5 is a schematic diagram showing a structure of the app-infrastructure coordination server 14 for receiving the above status change information.

This app-infrastructure coordination server 14 comprises an OS (not shown), a RAM and various input/output interfaces as well as the data storage section 30 and a program storage section 31, both of which are shown in this figure.

Stored in the data storage section 30 are user information 32, application information 33 under the bandwidth control of the present system, and a user/app-based bandwidth control and connection policy 34 configured based on the status change determination information of the mobile information terminal.

The program storage section 31 comprises an app status change information acquisition module 36 for receiving, from the mobile information terminal 3, communication status change information of apps on this terminal 3; a policy setup section 38 for obtaining the user/app-based communication bandwidth control and connection policy 34 based on the information obtained by the app status change information acquisition module 36, and sending the user/app-based communication bandwidth control and connection policy 34 to the communication bandwidth control router 8; a data communication amount recording section 39 for obtaining a communication amount of the terminal 3 from the line status/usage sensing server 15 and storing the communication amount in the data storage section 30 in association with a user/app; a communication upper limit determination section 40 for applying the communication amount for each app to the user/app-based communication bandwidth control and connection policy, and determining a communication upper limit; a data communication status display processing section 41 for generating an interface to display data communication status to the mobile information terminal 3; an app management software communication module 42 for communicating with the server communication module 27 of the app management software 16 in order to coordinate with the app management software 16; and a billing processing module 43 for processing billing according to a usage bandwidth and communication amount for each user application.

Basic operation of the app-infrastructure coordination server 14 will be discussed below with reference to FIG. 6. Reference alphanumerals S7-S17 in the figures correspond with Step S7-Step S17 in the following discussion, respectively.

In the app-infrastructure coordination server 14, communication with the mobile information terminal 3 is performed by the app management software communication module 42 communicating with the server communication module 27.

Figures 6, 7:
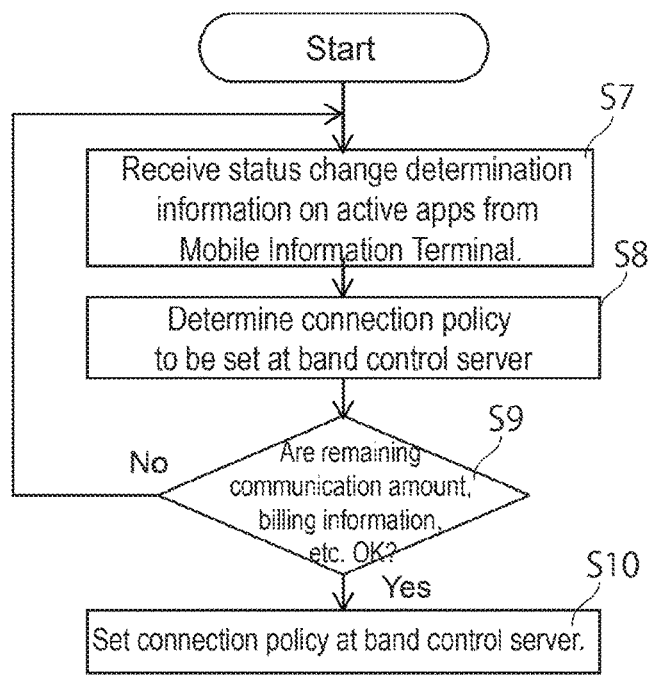
FIG. 6 is a flow chart showing processing steps of the app-infrastructure coordination server according to the one embodiment of the present invention.
FIG. 7 is a conceptual diagram describing a bandwidth control and connection policy according to the one embodiment of the present invention.

First, in Step S7 of FIG. 6, the app status change information acquisition module 36 receives status change information sent from the app management software 16 of the mobile information terminal 3 through the app management software communication module 42. As previously discussed, this status information includes an app name of an application active on the user's mobile information terminal 3, a domain name base, a coordinate location, app parameters, an IP address and a port number in use for the mobile information terminal 3. Next in Step S8, the communication bandwidth control policy setup section 38 sets a control bandwidth connection policy for each user/app based on the status change information.

Here, the user information 32 (FIG. 5) refers to information for linking the mobile information terminal 3 and user attributes and such user information stores therein the IP address and the port number received from the terminal 3, and may include information pertaining to if the user has a particular contract on communication bandwidth. Also, if that particular contract is for fee, billing processing for the user will be performed by the billing server 17 via the billing processing module 43 as will be discussed below. The communication bandwidth control policy setup section 38 recognizes the status change information received from the terminal 3 via the user information 32 so that the status change information will be linked to a particular user.

In addition, the application information 33 (FIG. 5) stores therein identification information of specific applications for which the bandwidth control connection is performed in the present system. In this embodiment, only some of applications installed on the mobile information terminal 3 are identified for the bandwidth control connection, and names of those applications subject to the bandwidth control connection are registered in the app information 33. In this embodiment example, in order that respective software of web browsers, YouTube®, Gmail®, Facebook®, Twitter®, Yahoo®, 050 (IP phone) may be recognized, their unique information is stored in the app information 33. The communication bandwidth control policy setup section 38 is adapted to recognize applications subject to the bandwidth control connection based on the app information 33.

The communication bandwidth control policy setup section 38 looks up the status change information, the user information 32 and app information 33 to thereby identify a connection policy for each user/app from the user/app-based communication bandwidth control and connection policy 34, and sets the identified policy to the bandwidth control router 8 (the compression conversion proxy 19 for a compression rate (Settings of the compression conversion proxy 19 are included in the bandwidth control settings and their descriptions are omitted here.)). A specific connection policy 34 in this embodiment example includes a communication bandwidth 34*a*, a data compression rate 34*b*, time frames available for communication 34*c*, locations available for communication 34*d*, a data communication upper limit 34*e* and a remaining data communication amount 34*f*.

FIGS. 7-10 are schematic diagrams illustrating a concept of connection policy set in the present embodiment.

FIG. 7 is a conceptual diagram showing an example policy setting on user/apps and line speeds (communication bandwidths) (34*a*). A default connection speed (connection bandwidth) for all applications other than the specific applications discussed above is set to 100 kbps, and an LTE speed is set for the specific applications. Also in this example setting, a mobile connection is not allowed for some applications and instead only a Wi-Fi connection is permitted.

FIG. 8 is a conceptual diagram showing an example policy setting on user/apps and remaining download amounts available for each application (34*e*, 34*f*). A default downloadable amount is set to unlimited, but it is set to 100 MB for the specific applications with the LTE speed connection setting. In this embodiment, the user can optionally increase this upper limit setting, in which case, the billing server 17 is configured so that it may charge the user for an excess usage amount above the default setting. Note that the billing method is not limited to the above and various methods may be employed.

The line speed (bandwidth control) and the remaining download amount described above mainly constitute the connection policy, but this embodiment allows setting of various policies (the data compression rate 34*b*, the time frames available for communication 34*c* and the locations available for communication 34*d*) in addition to the above line speeds. FIG. 9 shows its example comprehensively.

As shown in this FIG. 9, default (indicated with "all") values are set to 100 kbps, a "medium" compression rate, 100 MB of remaining download amount, both available time frames and locations unspecified, and 100 MB of monthly usage. Also, values for the specific applications are set as shown in this table.

Further in this example, as shown in a conceptual diagram of FIG. 10, a bandwidth control based on application-specific parameters may be also performed. In this example, one line speed is defined for each connection destination URL of a browser. This information is also stored in the data storage section 30 as the connection policy 34.

As shown in FIG. 6, when setting such a policy 34 in the bandwidth control router 8, this server 14 receives status change signals that the app status change information acquisition module 36 received from the app management software 16 (Step S7), identifies a user from an IP address and an port number, applies an app name and a user name to the user information 32, the app information 33 and the policy 34, and identifies a connection policy for the application (Step S8).

Specifically, the default connection policy is initially set as discussed above, wherein the communication speed and the communication amount upper limit are set to 100 kbps and unlimited, respectively, regardless of location and time. However, if it is detected that YouTube is launched and activated on the mobile information terminal 3, the connection policy specified for YouTube in FIG. 9 is identified (Step S8).

Next, the communication bandwidth control policy setup section 38 checks other conditions, that is, a remaining communication amount in this embodiment (Step S9), and if the conditions are met, sends the connection policy as determined above to the bandwidth control router 8 to set the policy (Step S10). This policy is set to the bandwidth control router 8 together with information for identifying the mobile information terminal 3, that is, the IP address and the port number in this example.

Based on the IP address and the port number of the packet source included in the packet, this bandwidth control router 8 performs the bandwidth control according to a corresponding connection policy. This bandwidth control router 8 will collectively perform the bandwidth control on all packets from the particular mobile information terminal 3, wherein a bandwidth with a speed matching the type of application will be reserved since the bandwidth control is based on an active application (YouTube in this case) in use by the user.

In this case, a time lag between the time the user switches active applications on the mobile information terminal 3 and the time the bandwidth control is set becomes important, wherein the time lag under an environment of this embodiment is less than 10 sec, which is considered to be unnoticeable by the user because a new bandwidth is set while an application is being loaded.

(Operation During Bandwidth-Controlled Communication)

Figure 11:
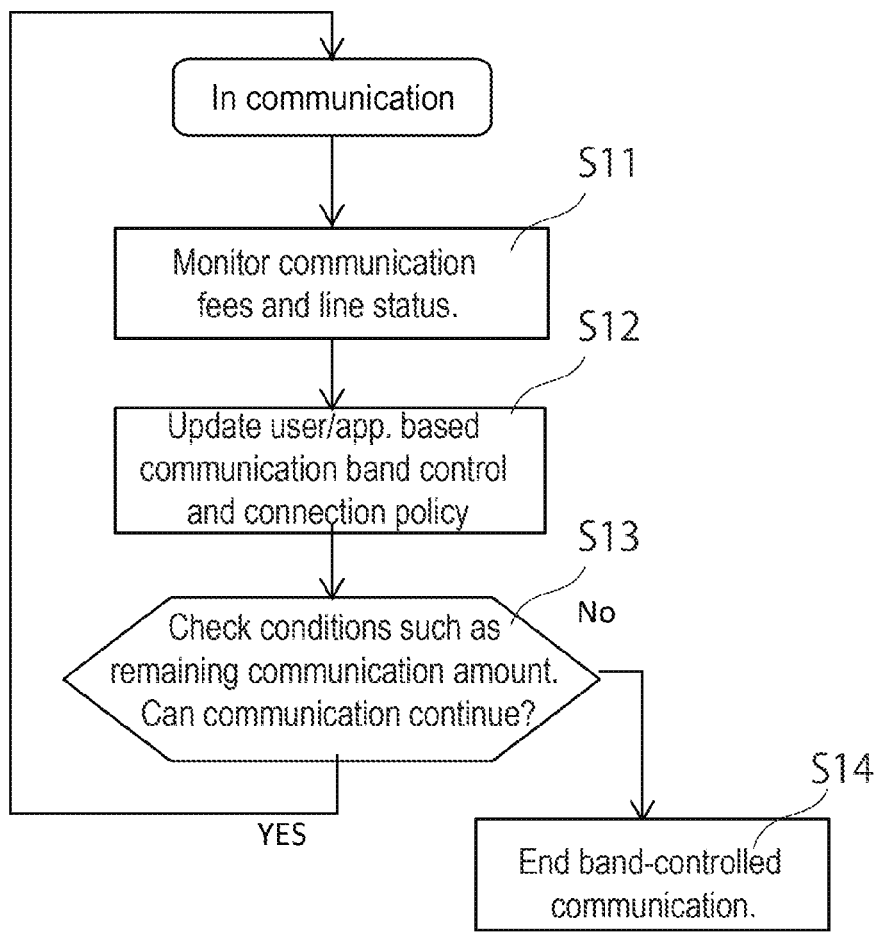
FIG. 11 is a flow chart showing processing steps of the app-infrastructure coordination server according to the one embodiment of the present invention.

Next, operation of the app-infrastructure coordination server 14 during the bandwidth-controlled communication will be discussed below with reference to FIG. 11 and later.

During communication, the data communication amount recording section 39 (shown in FIG. 5) of this server 14 monitors the communication status through the line status/usage monitoring server 15, and records the communication amount per unit time for the particular user's mobile information terminal 3 in association with an application in communication at that moment (Steps S11, S12). As shown in the schematic diagram of FIG. 8, this recording is executed by appropriately updating the remaining communication amount (currently 50 MB in the YouTube example) of the user/app-based communication bandwidth control and connection policy 34.

Next, the communication upper limit determination section 40 determines whether the remaining communication amount of the user/app-based communication bandwidth control and connection policy 34 has reached the upper limit (1 GB in the YouTube example) (Step S13), and the communication upper limit determination section 40 continues the current communication if the answer is "No", and resets the bandwidth control to the default values and sets the default values to the control bandwidth server if the answer is "Yes." (Step S14). Thus, preferential bandwidth control (75 Mbps in this example) of the application (YouTube in this example) ends, and its communication will be limited to the initial setting (default) line speed of 100 kbps.

Figure 4:
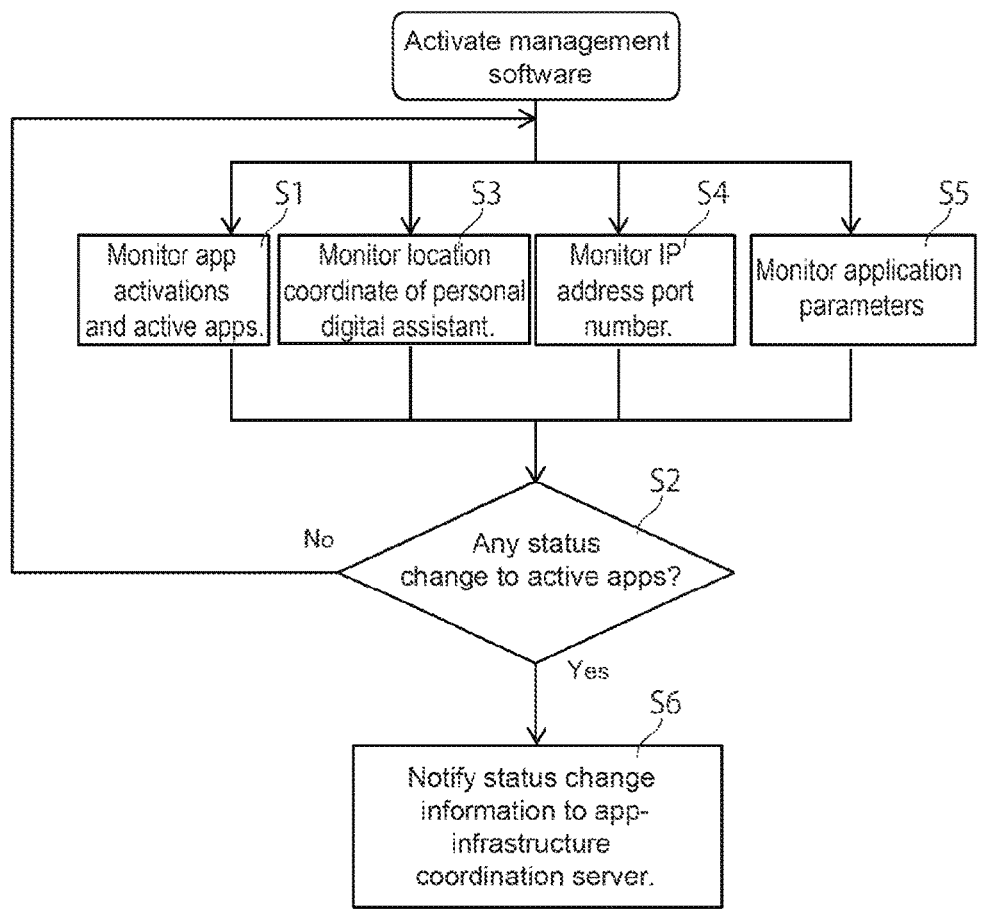
FIG. 4 is a flow chart showing processing steps of the app management software according to the one embodiment of the present invention.

Note that, when one application is in communication and another application also becomes active, operations shown in FIG. 4 and FIG. 6 are executed, and bandwidth control adapted to respective applications will be performed.

(Displaying Line Status)

Also, in this embodiment, the data communication status display processing section 41 shown in FIG. 5 comprises a function to present a data communication amount and a line congestion level for each app on the user's mobile information terminal 3. Specifically, this data communication status display processing section 41 sends time-series data for each app to be presented to the user in response to a request from the user's mobile information terminal 3. This data is displayed on a screen as shown in FIG. 12 and FIG. 13 by the app-based communication status display section 28 provided in the app management software of the user's mobile information terminal 3.

FIG. 12 illustrates an interface showing the line congestion level for each app. According to this figure, one can see that a web connection is congested, but YouTube connection still has some leeway. By seeing such an interface, the user may learn which software allows pleasant communication.

Figure 13:
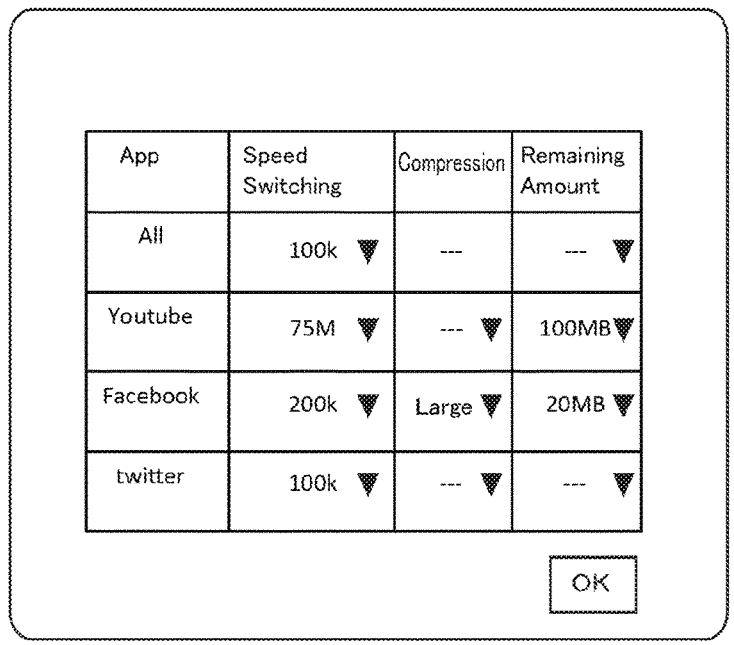
FIG. 13 is a diagram showing an example display screen of the mobile information terminal according to the one embodiment of the present invention.

FIG. 13 illustrates a user interface for setting a connection policy for each app. From this screen, the user may set the connection speed, the data compression rate and the remaining download amount for each app. That is, setting may be performed by selecting and setting each setting value and pushing an OK button on this screen. The set values are written and updated in the data storage section 30 (34) by the communication bandwidth control policy setup section 38 of the app-infrastructure coordination server 14.

(Billing Processing)

In this embodiment, the billing server 17 is configured to perform billing according to the user's data usage and usage bandwidth.

Figure 14:
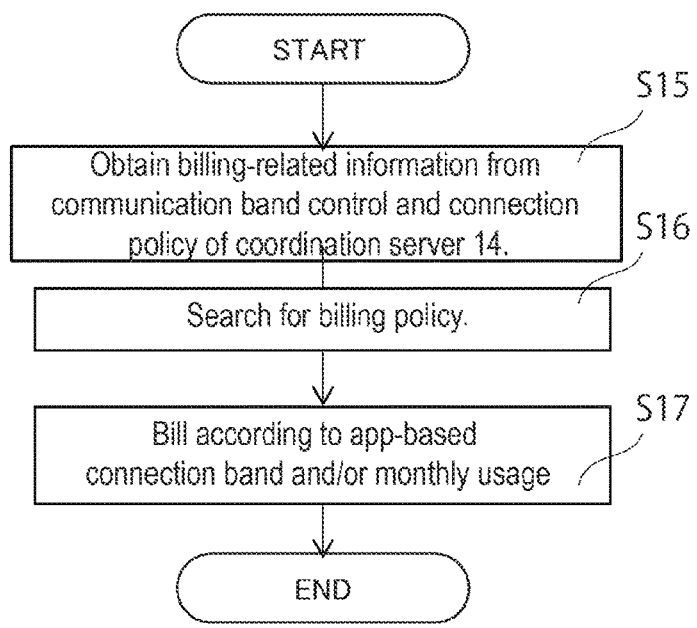
FIG. 14 is a flow chart showing billing processing steps of a billing server according to the one embodiment of the present invention.

In this case, as shown in a flow chart of FIG. 14, the billing server 17 coordinates with the billing processing module 43 of the app-infrastructure coordination server 14 to search for the user/app-based bandwidth control and connection policy 34 in the data storage section 30, and obtains registered communication bandwidths and usage amount (remaining amount) (S15). This billing processing module 43 sends the information as well as the user-identifying information to the billing server 17.

The billing server 17 maintains a billing policy (indicated with 17a in FIG. 2) and identifies a billing policy for each user based on the user information obtained from the coordination server 14 (Step S16). The billing policy may, for example, set a low data communication fee for movie sites such as user YouTube, and a high data communication fee for other web sites. Thus, billing processing may be performed according to the connection bandwidth and usage for each app for the user (Step S17).

According to the structure discussed above, communication control may be performed with a different control bandwidth for each application even when a plurality of applications are installed on a mobile information terminal 3 for network information communication.

It should be mentioned that the present invention is not limited to the above one embodiment, and that various changes and modifications can be made without departing from the scope and spirit of the present invention.

Figure 15:
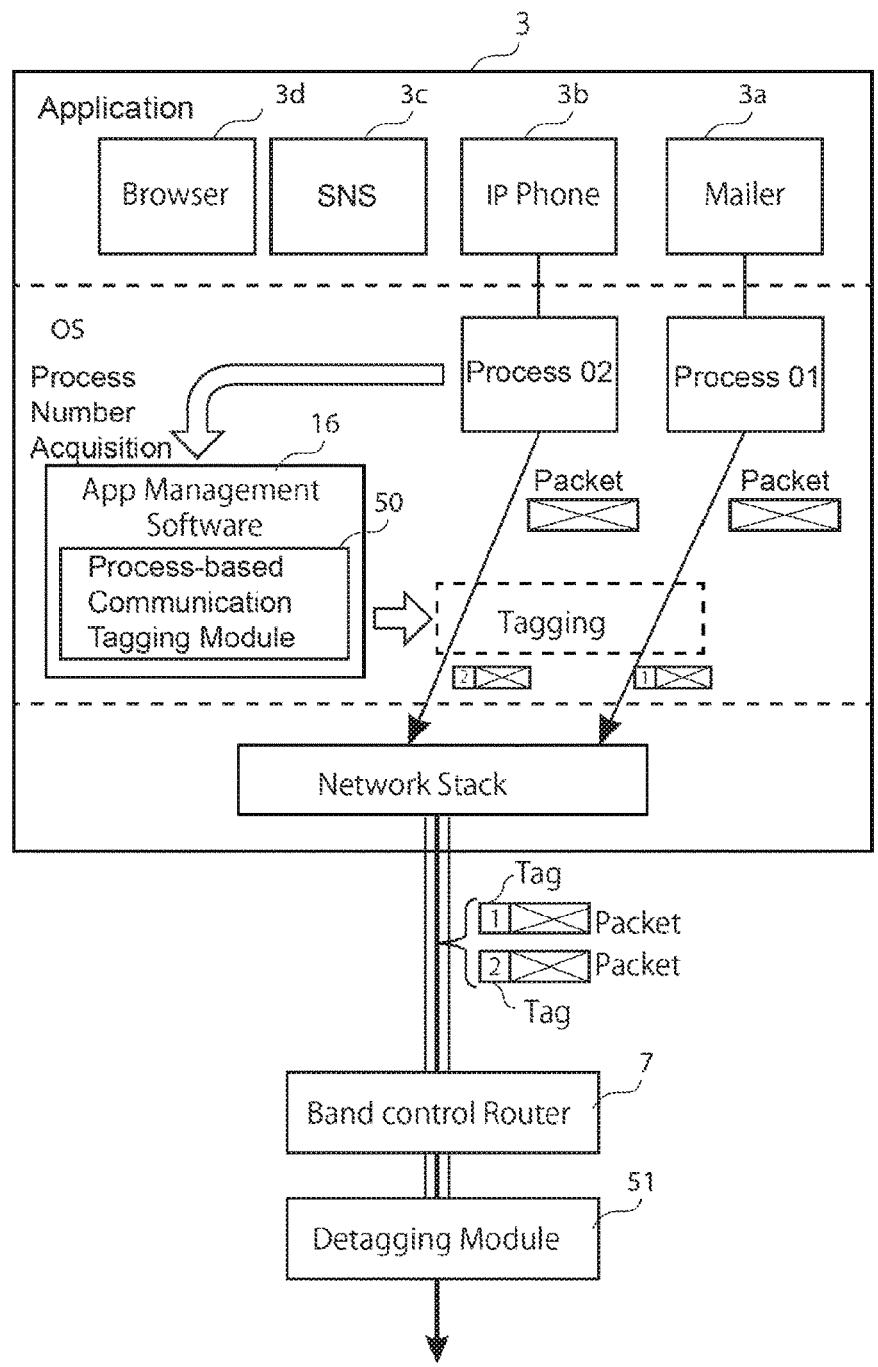
FIG. 15 is a schematic diagram showing a bandwidth control scheme according to another embodiment of the present invention.

First, in the above one embodiment, the connection bandwidth control of the terminal 3 was performed based on the application types which are displayed as active in foreground on the display screen 29 of the terminal 3 and which gained the user's attention, but the present invention is not so limited and, as shown in FIG. 15, may perform the bandwidth control based on the respective types of the plurality of applications 3a, 3b including applications running in the background. Control in this case will be discussed in detail below based on FIG. 15.

When an OS (e.g., Android®, etc.) of a mobile information terminal 3 launches an application on the mobile information terminal 3, it activates a process and outputs a unique process ID for each application. This process ID is detected by the IP address and port number detecting module 25 of the app management software 50, based on which a process-based communication tagging module (indicated with 50 in FIG. 15) provides a tag to respective packets, wherein the tag is unique to each process number. This tag may be a process ID itself of the above embodiment, or may be an app name, or other identifiers associated with the process ID. Thus, by tagging the respective packets, even during an identical communication by an identical terminal 3, identification of applications sending packets becomes possible not only for applications running in foreground of the terminal 3, but also for ones running in background of the terminal 3 and sending packets. This connection is terminated by a detagging module 51 provided in the system 2 of the MVNO operator, and the detagging module 51 is configured to delete the tags after the bandwidth control.

According to such a structure, even when a plurality of applications are communicating simultaneously on the terminal 3, the bandwidth control and preferential control may be performed based on different connection policies for each connection. Specifically, in Step S7 of FIG. 6, the app status change information acquisition module 36 receives status change information sent from the app management software 16 of the mobile information terminal 3 through the app management software communication module 42. Similarly to the previous discussion, this status information includes a tag provided based on the process ID for each application (in the previous embodiment, an application name is output based on if the application is active), a domain name base, a coordinate location, app parameters, a process name, an IP address and a port number in use for the mobile information terminal 3. Next in Step S8, the communication bandwidth control policy setup section 38 sets a control bandwidth connection policy for each user/app based on the status change information. Note that tag-to-app name associations needs to be sent to the app-infrastructure coordination server 14 ahead of time in order to be able to determine which app sent a particular packet based on the packet's tag, but in this embodiment, the tag-to-app name associations are sent by the status change determination module 26.

According to the above structure, since an application which sent out a particular packet may be identified based on a tag included in the particular packet, the bandwidth control, for example, narrowing a bandwidth or disconnecting a connection, may become possible not only for apps displayed as active on the screen of the mobile information terminal 3, but also for ones communicating in background of the terminal 3.

Note that, not only tagging for each application, but also allocation of different port numbers or different IP addresses (virtual IP address) may be performed to thereby establish a tunnel connection. This function is executed by the tagging module, network stack functions 50. According to such a structure, even when a plurality of applications are communicating simultaneously on the terminal 3, a communication bandwidth for packets of each app may be individually controlled (by the bandwidth control or the preferential control). Note that, when determining a priorities among apps, it is performed with a connection policy determined on the management server side. Also, in this case, the tunnel connection is established by the detagging module 51, which deletes the IP address and/or port number for each packet.

In yet another embodiment, the connection policy 34 is not limited to the connection policy of the above embodiment, and other policies may be also included. For example, as a data compression method executed by the compression proxy server 19, specific image conversion methods or movie conversion methods may be provided as well. For example, an image conversion may be configured so that, when a black and white conversion is employed, a high-resolution conversion will be also performed.

Further, in the above one embodiment, the bandwidth control function was provided through a method of allocating specific line speed values with the bandwidth control, a preferential control (allocating relative priorities instead of absolute line speed values) may be used in place of the bandwidth control to provide this function.

Also, in the above one embodiment, the connection policy was directly set to the bandwidth control router 8, but the present invention is not so limited. This may be performed indirectly, such as via the PGW 7.

Moreover, during operation of the bandwidth control communication (FIG. 11) of the above one embodiment, when the remaining communication amount of the user/app-based communication bandwidth control and connection policy 34 reaches the upper limit (1 GB in the YouTube example), the bandwidth control is reset to the default values (100 kbps) and these the default values are set to the control bandwidth server 8 (Step S14), but communication (routing) itself may be blocked.

What is claimed is:

1. A non-transitory computer readable storage medium storing application status change notification program instructions for causing a mobile information communication terminal to perform the following steps,
   wherein this application status change notification program cooperates with a bandwidth control system having an application connection environment management server and a bandwidth control router provided on the Internet for dynamically changing a communication bandwidth of the mobile information communication terminal according to a type of application which is installed on the mobile information communication terminal,
   said program instructions comprising the steps of:
   (1) detecting a type of application which communicates from the mobile information communication terminal;
   (2) obtaining mobile information terminal identification information for uniquely identifying the mobile information terminal on a communication network;
   (3) sending the type of application and information for identifying the mobile information communication terminal to the bandwidth control system; and
   (4) receiving a communication status for each application from the bandwidth control system and displaying the communication status on a display of the mobile information communication terminal,
   (5) generating a setting interface for setting, by a user, a connection policy, and sending the connection policy set with this interface to said application connection environment management server,
   wherein said bandwidth control system comprises said application connection environment management server detecting a type of application which is active on a specific mobile information terminal, and sending a connection policy according to the type of application as well as the information for identifying the mobile information communication terminal to said bandwidth control router, wherein said bandwidth control router transfers a packet from the identified mobile information communication terminal either with a preferential control or a predetermined preferred communication bandwidth according to the connection policy received from said application connection environment management server.

2. The non-transitory computer readable storage medium of claim 1, wherein
step (1) further comprises a step of detecting, by the mobile information terminal, a type of application which is displayed as active on the mobile information terminal.

3. The non-transitory computer readable storage medium of claim 1, wherein
step (1) further comprises a step of detecting, by the mobile information terminal, a process ID of an application which is activated on the mobile information terminal;
step (3) comprises a step of including, by the mobile information terminal, in a packet to be sent from the application, the process ID or a specific tag different for each process, and send the packet as well as the information for identifying the mobile information terminal to the bandwidth control system.

4. The non-transitory computer readable storage medium of claim 1, further comprising an instruction to cause the mobile information terminal to perform a step of:
detecting an IP address and/or a port number of an application which is activated on the mobile information terminal,
wherein the step (4) causes the mobile information terminal to include in a packet to be sent from the application, the IP address and/or the port number, and send the packet as well as the information for identifying the mobile information terminal to the bandwidth control system.

5. The non-transitory computer readable storage medium of claim 1, further comprising instructions to cause the mobile information terminal to perform the steps of:
detecting, by the mobile information terminal, a geographical location of the mobile information terminal; and
sending, by the mobile information terminal, the geographical location of the mobile information terminal as well as the information for identifying the mobile information terminal to the bandwidth control system.

6. The non-transitory computer readable storage medium of claim 1, wherein
the application connection environment management server looks up a table, which table storing therein types of applications requiring a preferential control and a bandwidth control, and the applications' respective connection policies, retrieves a connection policy from the table according to the type of application software, and sends the connection policy to the bandwidth control router.

7. The non-transitory computer readable storage medium of claim 1, wherein
the connection policy includes a different communication priority or communication bandwidth setting per specific application.

8. The non-transitory computer readable storage medium of claim 1, further comprising instructions to cause the mobile information terminal to perform:
a data communication amount recording step for monitoring a data communication amount by the bandwidth control router for each mobile information terminal and recording a downloaded data communication amount per application according to the type of application which is active on the mobile information terminal.

9. The non-transitory computer readable storage medium of claim 8, further comprising instructions to cause the mobile information terminal to perform:
a communication amount upper limit determination step for determining, according to the type of application which is active on the mobile information terminal, whether the data communication amount for each application recorded by the data communication amount recording step has reached a predetermined upper limit,
wherein the system comprises a communication restriction step for restricting transmission of packets from the mobile information terminal by the bandwidth control router according to the determination result of the communication amount upper limit determination step.

10. The non-transitory computer readable storage medium of claim 8, further comprising instructions to cause the mobile information terminal to perform:
a congestion level display step for calculating a line communication congestion level for each application based on the data communication amount per application recorded by the data communication amount recording step, and generating a congestion level display interface for displaying the congestion level to a user.

11. The non-transitory computer readable storage medium of claim 8, further comprising instructions to cause the mobile information terminal to perform:
a communication amount display step for generating a data communication amount display interface for displaying to the user, the data communication amount for each application recorded by the data communication amount recording step.

12. The non-transitory computer readable storage medium of claim 8, wherein
user billing is performed based on the data communication amount for each application recorded by the data communication amount recording step.

13. The non-transitory computer readable storage medium of claim 1, wherein
the connection policy includes a different data compression rate setting per specific application.

14. The non-transitory computer readable storage medium of claim 13, wherein
the data compression rate of the connection policy includes a different data conversion method setting per specific application.

15. The non-transitory computer readable storage medium of claim 1, wherein
the connection policy includes a different setting of time frames and locations available for communication per specific application.

16. The non-transitory computer readable storage medium of claim 1, wherein
the information for identifying the mobile information terminal is an IP address of the mobile information terminal.

17. The non-transitory computer readable storage medium of claim 1, further comprising instructions to cause the mobile information terminal to perform:
a user billing information acquisition step for receiving user billing information and associating the user billing information with the mobile information terminal.

18. The non-transitory computer readable storage medium of claim 1, wherein
the type of application received from the mobile information terminal identifies a type of service provided by the application.

19. The non-transitory computer readable storage medium of claim 1, wherein
a type of application software requiring a preferential control or a type of service provided by the application software include at least application software or a service for voice calls.

20. An application status change notification method for causing a mobile information communication terminal to perform the following steps,
wherein an application status change notification program cooperates with a bandwidth control system having an application connection environment management server and a bandwidth control router provided on the Internet for dynamically changing a communication bandwidth of the mobile information communication terminal according to a type of application which is installed on the mobile information communication terminal,
the method comprising the steps of:
(1) detecting, by the mobile information communication terminal, a type of application which communicates from the mobile information terminal;
(2) obtaining, by the mobile information communication terminal, mobile information terminal identification information for uniquely identifying the mobile information terminal on a communication network;
(3) sending, by the mobile information communication terminal, the type of application and information for identifying the mobile information terminal to the bandwidth control system;
(4) receiving, by the mobile information communication terminal, a communication status for each application from the bandwidth control system and displaying the communication status on a display of the mobile information terminal, and
(5) generating, by the mobile information communication terminal, a setting interface for a user to set a connection policy, and sending the connection policy set with the setting interface to said application connection environment management server,
wherein said bandwidth control system comprises said application connection environment management server detecting a type of application which is active on a specific mobile information communication terminal, and sending a connection policy according to the type of application as well as the information for identifying the mobile information communication terminal to said bandwidth control router,
wherein said bandwidth control router transfers a packet from the identified mobile information communication terminal either with a preferential control or a predetermined preferred communication bandwidth according to the connection policy received from said application connection environment management server.

21. The method of claim 20, wherein
the step (1) further comprises a step of causing the mobile information terminal to detect a type of application which is displayed as active on the mobile information terminal.

22. The method of claim 20, wherein
the step (1) comprises a step of causing the mobile information terminal to detect a process ID of an application which is activated on the mobile information terminal, and
the step (3) comprises a step of causing the mobile information terminal to include in a packet to be sent from the application, the process ID or a specific tag different for each process, and send the packet as well as the information for identifying the mobile information terminal to the bandwidth control system.

23. The method of claim 20, further comprising a step of:
causing the mobile information terminal to detect an IP address and/or a port number of an application which is activated on the mobile information terminal, and
wherein the step (34) causes the mobile information terminal to include in a packet to be sent from the application, the IP address and/or the port number, and send the packet as well as the information for identifying the mobile information terminal to the bandwidth control system.

24. The method of claim 20, further comprising steps of:
causing the mobile information terminal to detect a geographical location of the mobile information terminal; and
causing the mobile information terminal to send the geographical location of the mobile information terminal as well as the information for identifying the mobile information terminal to the bandwidth control system.

25. The method of claim 20, wherein
the application connection environment management server looks up a table, which table storing therein types of applications requiring a preferential control and a bandwidth control, and the applications' respective connection policies, and retrieves a connection policy from the table according to the type of application software, and sends the connection policy to the bandwidth control router.

26. The method of claim 20, wherein
the connection policy includes a different communication priority or communication bandwidth setting per specific application.

27. The method of claim 20, wherein
the application status change notification program comprises a data communication amount recording step for monitoring a data communication amount by the bandwidth control router for each mobile information terminal and recording a downloaded data communication amount for each application according to the type of application which is active on the mobile information terminal.

28. The method of claim 27, wherein
the application status change notification program comprises a communication amount upper limit determination step for determining, according to the type of application which is active on the mobile information terminal, whether the data communication amount per application recorded by the data communication amount recording step has reached a predetermined upper limit,
wherein the system comprises a communication restriction step for restricting transmission of packets from the mobile information terminal by the bandwidth control router according to the determination result of the communication amount upper limit determination step.

29. The method of claim 27, wherein
the application status change notification program comprises a congestion level display step for calculating a line communication congestion level for each application based on the data communication amount for each application recorded by the data communication amount recording step, and generating a congestion level display interface for displaying the congestion level to a user.

30. The method of claim 27, wherein
the application status change notification program comprises a communication amount display step for generating a data communication amount display interface for displaying to the user, the data communication amount for each application recorded by the data communication amount recording step.

31. The method of claim 27, wherein
user billing is performed based on the data communication amount for each application recorded by the data communication amount recording step.

32. The method of claim 20, wherein
the connection policy includes a different data compression rate setting per specific application.

33. The method of claim 32, wherein
the data compression rate of the connection policy includes a different data conversion method setting per specific application.

34. The method of claim 20, wherein
the connection policy includes a different setting of time frames and locations available for communication per specific application.

35. The method of claim 20, wherein
the information for identifying the mobile information terminal is an IP address of the mobile information terminal.

36. The method of claim 20, wherein
the application status change notification program comprises a user billing information acquisition step for receiving user billing information and associating the user billing information with the mobile information terminal.

37. The method of claim 20, wherein
the type of an application received from the mobile information terminal identifies a type of service provided by the application.

38. The method of claim 20, wherein
a type of application software requiring the preferential control or a type of service provided by the application software include at least application software or a service for voice calls.

\* \* \* \* \*